March 20, 1962 R. E. REASON 3,025,701
APPARATUS FOR MEASURING OR INDICATING THE
ROUGHNESSES OR UNDULATIONS OF A SURFACE
Filed Oct. 27, 1958 2 Sheets-Sheet 1
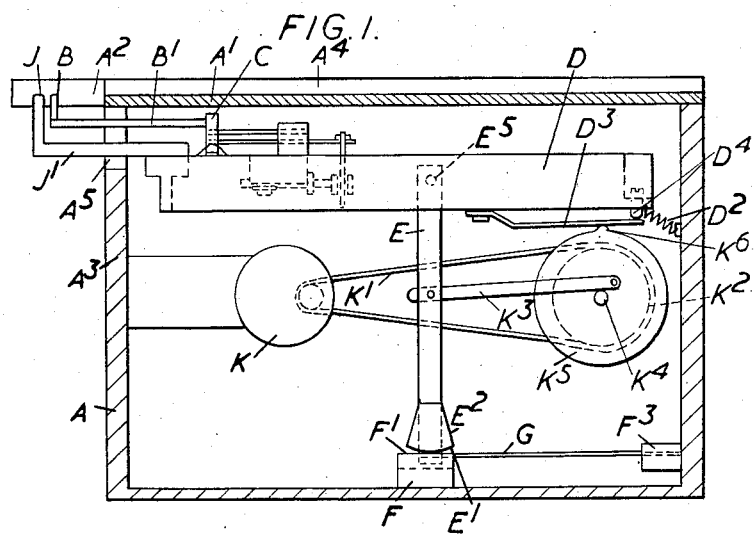
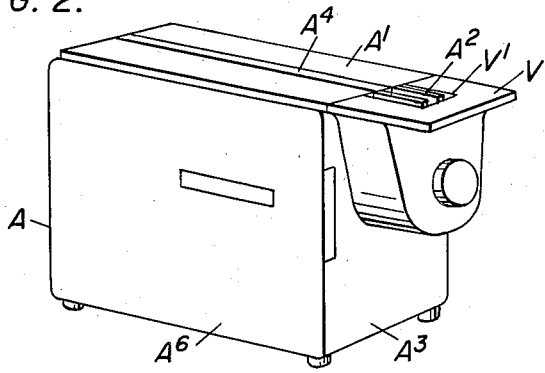
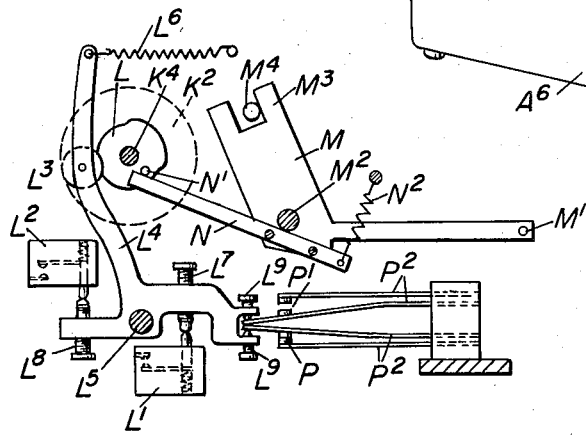
Inventor
R.E. REASON
By
Holcomb, Wetherill & Brisebois
Attorneys March 20, 1962 R. E. REASON 3,025,701
APPARATUS FOR MEASURING OR INDICATING THE
ROUGHNESSES OR UNDULATIONS OF A SURFACE
Filed Oct. 27, 1958 2 Sheets-Sheet 2
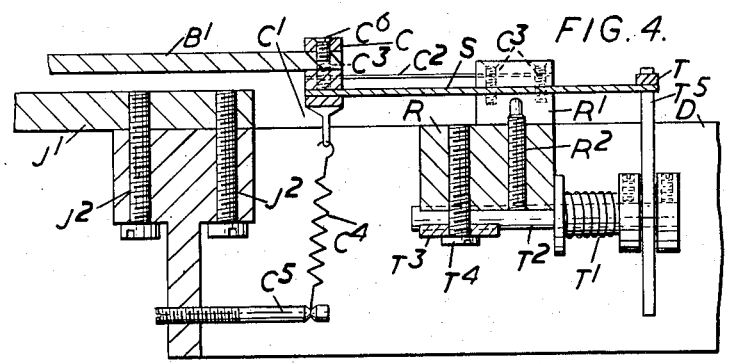
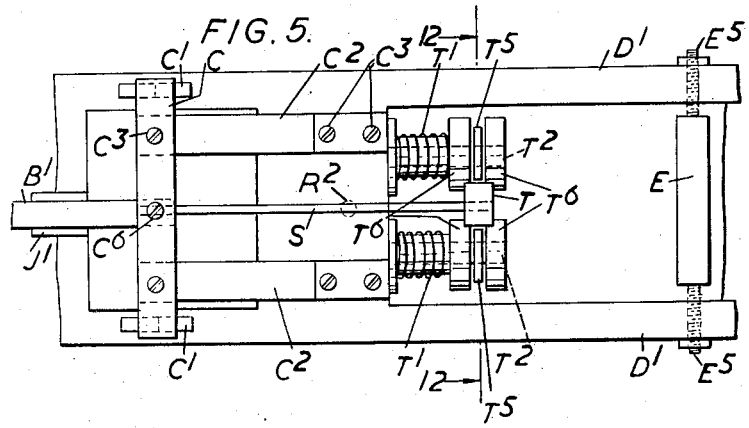
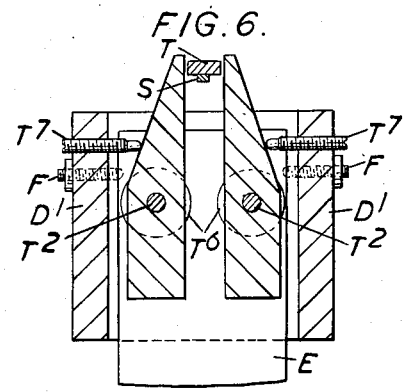
Inventor
R. E. REASON
By
Holcombe, Wetherill + Brisebois
Attorneys United States Patent Office 3,025,701
Patented Mar. 20, 1962

3,025,701
APPARATUS FOR MEASURING OR INDICATING THE ROUGHNESSES OR UNDULATIONS OF A SURFACE
Richard Edmund Reason, Leicester, England, assignor to Taylor, Taylor & Hobson Limited, Leicester, England, a British company
Filed Oct. 27, 1958, Ser. No. 769,640
Claims priority, application Great Britain Nov. 1, 1957
14 Claims. (Cl. 73—105)

This invention relates to apparatus for measuring or indicating the roughnesses or undulations of a surface, in which a stylus is traversed along the test surface and the working movements of the stylus approximately at right angles to the test surface during traversing are utilised by suitable detecting means to operate a measuring or indicating instrument. In some instances, a member carried by or forming part of the casing of the apparatus is employed for engaging with the workpiece whose surface is to be tested (either by placing the workpiece on such member or by moving the casing to cause the member to engage with the workpiece), the stylus protruding when necessary from such member into engagement with the test surface. With such an arrangement, if capable of dealing with a variety of shapes and sizes of workpiece, the stylus may protrude a considerable distance from the member when there is no workpiece in engagement therewith and is consequently very liable to be damaged.

The present invention has for its object to provide an improved measuring or indicating apparatus of this kind in which risk of such damage to the stylus is avoided or minimised.

The apparatus according to the invention comprises a casing, a member carried by or forming part of the casing for engaging with the workpiece, a stylus, means for urging the stylus into engagement with the test surface of the workpiece, driving means within the casing for traversing the stylus along the test surface, detecting means within the casing responsive to the working movements of the stylus approximately normal to the test surface during the traversing movement for operating a measuring or indicating instrument, and means whereby the driving means (or a control therefor) acts at the end of the traversing movement to cause the stylus to be retracted into a position in which it will not project appreciably beyond the surface of the work-engaging member when such member and the workpiece are no longer in engagement. Conveniently, the stylus is released from its retracted position when the driving means is started up in readiness for a fresh traversing movement whereby the stylus will again be urged into engagement with the test surface. Usually, the work-engaging member will be provided with a slot through which the stylus projects into engagement with the test surface and along which the stylus is traversed, and in one convenient arrangement the work-engaging member projects outwardly from the casing and is constituted by an elongated slotted extension of a plate-like member carried by or forming part of the casing. Such a work-engaging member can readily be arranged to enable external or internal surfaces of small radius to be tested, as well of course as surfaces of large radius and flat surfaces.

Preferably, the stylus is carried by a supporting arm, which is pivotally mounted on a pick-up head through which the traversing drive is transmitted to the stylus and is biassed relatively to the pick-up head to hold the stylus in engagement with the test surface during traversing, the detecting means being responsive to the relative movements between the stylus and the pick-up head in a direction approximately normal to the direction of traversing. The pick-up head may itself be pivoted to a member to which the traversing drive is applied and biassed so that a rounded skid carried by the pick-up head is urged into engagement with the test surface, thereby affording a reference datum for the working movements of the stylus. In such case, the driving means may act to effect the retraction of the stylus at the end of the traversing movement by causing the pick-up head to move about its pivot whereby the rounded skid is also retracted into a position in which it does not project appreciably beyond the surface of the work-engaging member. For instance, the driving means may include a rotatable member, which at the end of the traversing movement engages with the pick-up head or a part carried thereby to effect the retraction of the skid and the stylus and thereafter remains in engagement therewith while the driving means is at rest and until the driving means is restarted to effect a fresh traversing movement.

The detecting means preferably consists of a detector device (for example a piezo-electric crystal) on a detector support carried by the pick-up head. The arrangement forming the subject of the present applicant's United States of America patent application Serial No. 742,415, filed June 16, 1958, may conveniently be used. In this arrangement, at least one of two normally operative connections respectively between the stylus supporting arm and the detector device and between the detector support and the pick-up head includes a yieldable coupling for rendering the detector device unresponsive to the working movements of the stylus, and clamping means is provided which can be operated to make the yieldable coupling unyielding and thereby to render the detector device responsive to the working movements of the stylus. The clamping means may be operated electromagnetically under the control of a switch actuated by the driving means at the beginning of the traversing movement after the stylus has been released from its retracted position.

The invention may be carried into practice in various ways, but a preferred practical arrangement of measuring or indicating apparatus according thereto will now be described by way of example, with reference to the accompanying drawings. This arrangement also incorporates the invention of the present applicant's copending United States of America patent application Serial No. 748,485, filed July 14, 1958. In the drawings, FIGURE 1 is a diagramamtic view of the preferred arrangement in side elevation, FIGURE 2 shows the casing of the preferred arrangement with an auxiliary work-table detachably fitted thereon, FIGURE 3 shows a switch mechanism operable by the drive to the driving arm illustrated in FIGURE 1, and viewed from the direction opposite to that of FIGURE 1, FIGURE 4 is an enlarged view in vertical section of the pick-up unit shown in FIGURE 1, FIGURE 5 is a plan view of the pick-up unit shown in FIGURE 4, and FIGURE 6 is a sectional view of the pick-up unit on the line 6—6 of FIGURE 5.

In the preferred arrangement, the main parts of the apparatus are carried in a box-like casing A (see FIGURE 1), whose upper wall carries a top plate $A^1$ of hardened metal which has an integral slotted nose-piece $A^2$ projecting from the centre of one of its edges so that such slotted nose-piece $A^2$ extends outwardly from above one side wall $A^3$ of the casing A. Conveniently, a groove $A^4$ is provided in the top plate $A^1$ continuous with the slot in the nose-piece $A^2$, for a purpose to be later described. A stylus B having a sharp tip of very small radius (for example 0.0002 of an inch) projects upwardly through the slot in the nose-piece $A^2$ from a supporting arm $B^1$ so that the tip of the stylus B is approximately level with the top surface of the nose-piece $A^2$. The stylus supporting arm $B^1$ extends from below the stylus B approximately horizontally through a hole $A^5$ in the side wall $A^3$ of the casing A and is pivoted at an intermediate point in its length to a hollow pick-up head D extending generally parallel to the top plate $A^1$ within the casing A. The pick-up head D is pivotally connected at an intermediate point to one end of a driving arm E which at its other end carries a rounded bearing surface $E^1$ maintained in rolling engagement with a plane guide surface $F^1$ carried on an upward projection F from the base of the casing A. The stylus arm $B^1$ extends lengthwise parallel to the pick-up head D with its pivotal connection thereto having an axis transverse to its length. Conveniently, as is more clearly shown in FIGURE 5, the pivotal connection between the pick-up head D and the driving arm E comprises a pair of inwardly directed pointed screw plugs $E^5$ projecting through the side walls $D^1$ of the pick-up head D, such pointed projections $E^5$ gripping between them the driving arm E so as to define a pivotal axis at right angles to the length of the pick-up head D. The other end of the driving arm E is secured to one end of a spring ligament G which extends lengthwise in the plane of the guide surface $F^1$ on which the bearing surface $E^1$ on the arm E is to roll and which at the other end is firmly secured in the plane of such guide surface. Preferably, as indicated in FIGURE 1, the rounded bearing surface $E^1$ is defined by the rounded lower edges of two plates $E^2$ carried by the lower end of the driving arm E on opposite sides thereof. The upward projection F carrying the plane guide surface $F^1$ is recessed between the planes of the two plates $E^2$ to receive the lower end proper of the driving arm E, one end of the ligament G being secured to such lower end in the plane of the guide surface $F^1$. The ligament G is of such size and dimensions that, while it is substantially rigid in or approximately in the guide plane, and thus substantially prevents sliding movement between the rounded end face $E^1$ and the guide surface $F^1$, it is sufficiently flexible in a direction at right angles to the guide plane readily to permit rotational movement of the driving arm E about the axis of curvature of its rounded bearing surface $E^1$. The bearing surface $E^1$ is cylindrically curved about the axis of the pivotal connection of the pick-up head to the driving arm, such axis being defined by the pointed projections $E^5$ as above mentioned, so that when such rolling occurs, such pivotal connection will move in a straight line path parallel to the guide surface $F^1$.

The pick-up head D carries an arm $J^1$ extending lengthwise parallel to the length of the pick-up head D beneath the stylus supporting arm $B^1$ and on which is mounted a skid J of relatively large radius (for example an inch) compared with that of the stylus B, the arm $J^1$ extending through the hole $A^5$ in the casing wall $A^3$ below the slotted projection $A^2$ so that the skid J extends upwardly through the slot in the nose-piece $A^2$ adjacent to the stylus B. The pick-up head D is balanced about the upper end of the driving arm E and a spring $D^2$ anchored to the casing A acts on the pick-up head D to cause the skid J to be urged upwardly to bear against the surface to be tested when the work-piece carrying such surface is placed on the slotted projection $A^2$, which thus constitutes a support for the work-piece. As shown in FIGURE 2, when it is desired to test the nominally flat surface of a small body, an auxiliary supporting table V having a slot $V^1$ for accommodating the nose-piece $A^2$ may be secured to the casing A so as to constitute an extension of the hardened top plate $A^1$. The body is then placed with its flat test surface on the extension table V over the slotted nose-piece $A^2$ ready for testing.

In order to test a cylindrical body of small diameter, such body may be located accurately on the nose-piece $A^2$ by placing it in the groove $A^4$ of the hardened top plate $A^1$. Whether or not as shown in the drawings the slot extends to the free end of the nose-piece $A^2$, the groove $A^4$ may continue to such free end so that a long thin cylindrical body can readily be placed in position. Workpieces in the form of rings or other annular bodies may be tested by location thereof over the slotted nose-piece $A^2$, the extension table V having been removed.

The driving arm E is driven at an intermediate point in its length, whereby the upper end of the driving arm E is caused to move in a substantially straight line, carrying the pick-up head D with it. The pick-up head D is thus traversed along the test surface in a substantially straight line, the skid J being constantly urged upwardly into engagement with such test surface by the previously mentioned spring $D^2$ acting on the pick-up head D about the pivotal connection at the upper end of the driving arm E.

In the preferred arrangement for driving the driving arm shown in FIGURE 1, an electric motor K drives through reduction gearing, such as the belt drive indicated at $K^1$, $K^2$, a main driving shaft $K^4$ connected to the intermediate point of the driving arm E through a crank rod $K^3$. The main driving shaft $K^4$ carries two cams, one of which $K^5$ controls retraction of the stylus B according to the main feature of the present invention, whilst the other L operates various electric switches, the arrangement being such that the main driving shaft makes one complete revolution for each traversing movement of the stylus and the associated operating functions of the apparatus.

In another form, the main driving shaft is arranged to make a number of revolutions for each traversing movement and causes the stylus to reciprocate relatively quickly backwards and forwards along the work surface, so that one traversing movement includes several traverses. In this arrangement, the two cams are mounted on a second shaft geared to the main driving shaft and making one revolution for each complete traversing movement.

Various forms of measuring or indicating instrument may be used, but in a preferred arrangement such instrument takes the form of an integrating meter, which with a traversing movement consisting of a single relative slow traverse of the stylus gives a reading of the average roughness of the test surface, the meter being controlled through an amplifier by a detector device responsive to the working movements of the stylus approximately at right angles to the test surface during traversing. Alternatively, for the case when the complete traversing movement includes a number of traverses, an indicating instrument of long period or heavily damped may be used.

A convenient arrangement for the operation of electric switches by the cam L is shown in FIGURE 3, and in this arrangement the cam controls a switch $L^1$ for controlling the driving motor K and a switch $L^2$ for controlling a clamp which when operated completes a coupling through which the stylus movements are transmitted to the integrating meter. Movement of the cam L is initiated by means of a lever M operated by a handle (diagrammatically indicated at $M^1$) from outside the casing A. The lever M is pivoted at an intermediate point $M^2$ to the casing A and at its end has a forked portion $M^3$ cooperating with a fixed stop $M^4$ for limiting movement of the lever M in either direction. The lever M carries a latch arm N extending towards the cam L, such arm N, when the lever M is moved from its rest position, engaging with a detent $N^1$ on the cam L so as to cause a small rotation of the cam L sufficient to cause operation of the motor switch $L^1$ in the manner to be described. A spring $N^2$ acts on the lever M through the arm N normally to keep the lever M in its rest position. The cam L cooperates with a roller $L^3$ carried on a switch-operating lever $L^4$ pivoted at $L^5$ to the casing A, the roller $L^3$ being maintained in engagement with the cam L by a spring $L^6$ acting on the lever $L^4$ on the side of the roller $L^3$ remote from the pivot $L^5$. The lever $L^4$ carries two contact-operating elements $L^7$ and $L^8$ respectively for operating the motor switch $L^1$ and the clamp switch $L^2$, and also, on the arms of a forked portion of such lever $L^4$, a pair of aligned contact-operating elements $L^9$ for controlling two pairs of contacts P and $P^1$ for the integrating meter. Each contact of the contact pairs P and $P^1$ is conveniently carried on one end of a spring arm $P^2$ fixed at the other end with respect to the casing A. When the lever M is in its rest position, the contact pair P is closed and the integrating meter is short-circuited.

The detector device may consist for instance of a piezo-electric crystal, and for satisfactory cooperation of such detector device with the stylus, it is convenient to employ the arrangement forming the subject of the present applicant's copending United States of America patent application Serial No. 742,415, filed June 16, 1958. This arragement provides a highly satisfactory coupling to the stylus arm for a relatively "stiff" detector device, such as a piezo-electric crystal, which offers considerable resistance to more than a very small movement. With such a detector device it is desirable to provide a coupling which will accommodate the relatively large movements necessary for initial adjustment to bring the stylus into proper operative engagement with the test surface with the desired contact pressure, whilst at the same time retaining the desired sensitivity of the detector device to the small movements of the stylus during traversing. It will be appreciated that with the above described arrangement for mounting various types of work-piece, sufficient initial movement of the stylus must be allowed to embrace the extreme initial stylus positions encountered firstly when an annulus of small radius is supported on the nose-piece when the test line on its inner surface will be spaced above the top face of the nose-piece, and secondly when a cylinder of small radius is rested in the groove over the slot in the nose-piece when its test line is below the top face of the nose-piece. It is also preferable but not essential that this initial movement should not be accompanied by a build-up of force due to crystal strain owing to the relative stiffness of the crystal.

One arrangement described in the above-mentioned patent application is shown in FIGURES 4, 5 and 6, which show the pick-up head D on an enlarged scale. As has been previously mentioned, such pick-up head D consists of a hollow body pivoted at an intermediate point in its length to the upper end of the driving arm E. The skid supporting arm $J^1$ is mounted on one end of such hollow pick-up head D by means of two securing screws $J^2$. The stylus supporting arm $B^1$, which at one end is secured by means of a screw $C^6$ to the cross-piece C mentioned earlier, is pivoted relatively to the pick-up head D by means of a knife-edge and ligament hinge connection. Thus, the pick-up head D carries two horizontal knife-edges $C^1$ transverse to the length of the pick-up head and each cooperating with the flat underside of one end of the cross-piece C. A pair of spring ligaments $C^2$ are secured at one end to the cross-piece C near the ends thereof but between the two knife-edges $C^1$ substantially in the horizontal plane defined by such knife-edges, such ligaments $C^2$ being secured at their other ends in the same horizontal plane to upward projections $R^1$ from a cross-support R within the pick-up head D. Screws for securing the ligaments $C^2$ in position are indicated at $C^3$. The ligaments $C^2$ act to minimise slip at such knife-edges $C^1$. In order to keep the cross-piece C in engagement with the knife-edges $C^1$, a spring $C^4$ acts to urge the cross-piece downwardly, the anchorage $C^5$ for such spring $C^4$ being mounted in the pick-up head D so as to be adjustable in the direction of the length of the pick-up head D. In this way, the position of the anchorage $C^5$ can be adjusted so that the stylus B is lightly urged upwardly with respect to the pick-up head D and the skid J with the required stylus pressure. The cross-piece C, between the ligaments $C^2$, carries a detector device constituted by a piezo-electric element S which extends away from the cross-piece C in the opposite direction to the stylus supporting arm $B^1$ and passes between the upward projections $R^1$ from the cross-support R. An adjustable stop $R^2$ projects upwardly from the cross-support R within the pick-up head D to engage the detector element S at an intermediate point in the length thereof. The detector element S rests on the stop $R^2$ and thus the level of such stop $R^2$ determines the initial or nominal projection of the tip of the stylus B beyond the tip of the skid J. The detector element S is electrically connected through an amplifier to an indicating device (which may for example be constituted by the meter previously mentioned) by means of which the variations in the electric potential difference developed across such piezo-electric element as its flexure changes can be measured.

The end of the detector element S remote from the cross-piece C, beyond the projections $R^1$ from the pick-up head D, carries a small plate-like armature T of magnetisable material lying in a horizontal plane. Adjacent thereto, the pick-up head D carries clamping means which, when operated (for example by means of the cam-operated switch previously described) fixedly locate a line through the plate-like armature T parallel to the axis of the pivot for the cross-piece C carrying the stylus B and the detector element S. As shown in FIGURES 4, 5 and 6 such clamping means comprises a pair of magnetisable cores $T^2$ which are clamped in grooves in the underside of the cross-support R carried by the pick-up head D by means of a magnetisable clamping plate $T^3$ held by a clamping screw $T^4$. Each core $T^2$ also constitutes a shaft on which pivots a clamping arm $T^5$ of magnetisable material which extends upwardly from the shaft $T^2$ to one side of the plate-like armature T. The magnetic circuit through the cores $T^2$, the clamping plate $T^3$, the clamping arms $T^5$, the armature T and the air gaps on each side thereof, is energised by current through coils $T^1$ carried on bobbins $T^6$. When such coils $T^1$ are energised, the clamping arms $T^5$, pivoted on their supporting shafts $T^2$, are drawn towards each other, thereby gripping the armature T between them substantially along a single line. Stops $T^7$ (for clarity omitted in FIGURE 5 but shown in FIGURE 6) are provided to limit the gap between the clamping arms $T^5$ and the armature T when the coils $T^1$ are not energised. If desired, weak return springs (not shown) may be used for returning the clamping arms $T^5$ to their rest positions when the coils $T^1$ are deenergised.

It will be appreciated that, when the clamping means is operated, the position of the armature T relative to the pick-up head D is held fixed; and the stylus support $B^1$ and the detector element S carried by the cross-piece C are no longer able to pivot relatively to the pick-up head D without flexing the detector element S.

It will be realised that, with the arrangement so far described, the skid and the stylus, which must be free to project beyond the top face of the nose-piece to engage with a test surface in the extreme position with which the apparatus can deal, would in the normal rest position, when there is no workpiece on the nose-piece, project considerably above the nose-piece and would therefore be liable to be damaged or even broken off, for example by a workpiece accidentally sliding across the top plate of the casing. In order to prevent this, means are provided for retracting the skid and stylus into a safe position after a traverse has been completed. This is effected, as already mentioned and as shown in FIGURE 1, by means of a cam $K^5$ on the main driving shaft $K^4$ or on a shaft geared thereto. This cam $K^5$ has a projection $K^6$ which comes into engagement with an abutment plate $D^3$ adjustable by means of the screw $D^4$ and thereby rocks the pick-up head about its pivot $E^5$ and retracts the skid J and the stylus C, the adjustment being provided to allow for mechanical tolerances. The shape of the cam $K^5$ is such as to leave the pick-up head free to move as required for the normal operation of the apparatus in all positions except when the projection $K^6$ engages with the abutment on the pick-up head, and such engagement is arranged to take place shortly after the conclusion of the measuring portion of the traversing movement (whether consisting of one or more traverses). The switch $L^1$ actuated by the other cam L on the shaft $K^4$ disconnects the electric motor K when the skid and stylus have been retracted and thus brings the apparatus to rest with the skid and stylus still in their retracted positions. When the motor K has been started up again by the operation of the starting lever M for a fresh traversing movement, the cam projection $K^6$ moves away from the abutment on the pick-up head D and thus allows the skid and stylus to move under the action of their biassing springs into engagement with the test surface.

A preferred cycle of operation of the preferred form of apparatus using an integrating meter will now be described, starting from the rest position, with the skid and stylus fully retracted. At this stage, the crank $K^3$ in the traversing drive is occupying an angular position somewhat short, say by 15 degrees of its outer dead centre. When the workpiece has been properly placed on the nose-piece in readiness for its surface test, the starting lever M is operated. This lever M acts through the latch arm N and the detent $N^1$ on the cam L to cause the main driving shaft $K^4$ to rotate through an angle, say 10 degrees, sufficient to close the motor switch $L^1$. This starts up the motor K, so that the drive continues, the starting lever M being thereafter released. At the 15 degree position, the crank $K^3$ reaches its outer dead centre, but meanwhile the projection $K^6$ on the first cam $K^5$ has been gradually moving away from its position of maximum retraction, so that the skid J and stylus B have been moving towards the test surface, the projection $K^6$ finally disengaging from the abutment $D^4$ approximately at the 15 degree position so that the skid and the stylus come into engagement with the work at a moment when there is no traversing movement. The clamp T, $T^5$ at this stage is disengaged and the stylus B will therefore take up its correct position relatively to the pick-up head D. A few degrees later say at the 25 degree position, the second cam L operates the switch $L^2$ which operates the clamp and therefore renders the detector device responsive to the working movements of the stylus. Meanwhile the crank $K^3$ has left its outer dead centre position and has begun to drive the pick-up head D back to the starting position for the next traverse, this movement continuing as the main driving shaft $K^4$ rotates.

The second cam L also actuates the contact pairs P, $P^1$ controlling the circuit to the integrating meter. It should be mentioned that in the normal rest position, the contact pair P is in its closed position in which the intergrating meter is short-circuited, so that its pointer remains in the indicating position in which it was left at the end of the previous traverse. At an early stage in the angular movement, say at 50 degrees, the second cam L moves the contact pair $P^1$ to its closed position, in which reverse current flows to the meter to drive the pointer back to the zero position.

The drive continues in this way until the 195 degree position is reached, when the crank $K^3$ reaches its inner dead centre and thereafter begins to drive the pick-up head D in the forward direction. The measuring stroke, however, has not yet started, because the meter is still being fed with reverse current, and it is not until the 240 degree position is reached that the contact pair $P^1$ is opened so that the meter receives measuring current under the control of the detector element S, whose flexure (and therefore its electrical output) is determined by the working movements of the stylus B relatively to the pick-up head D. The meter is thus operated by the detector element through an amplifier in accordance with the stylus movements, and its pointer moves over the scale accordingly. The measuring stroke continues for a 90 degree movement of the driving shaft $K^4$, the meter meanwhile integrating the stylus movements, so that at the end of the measuring stroke the pointer will have reached a position representative of average roughness of the test surface over the constant length of traverse determined by the 90 degree rotation. The measuring stroke is ended at the 330 degree position by the further actuation of the contact pair P to its closed position, in which the meter is short-circuited, thus retaining the reading, which can be read off at leisure.

A few degrees later, say at 345 degrees, the second cam L opens the clamp switch $L^2$ and thus frees the stylus B and renders the detector element S unresponsive to the stylus movements. At about the same angular position, the projection $K^6$ on the first cam $K^5$ comes into engagement with the abutment $D^4$, so that the retraction of the skid and stylus commences.

The skid and stylus reach their fully retracted position at the 360 degree position, the second cam L at this point acting to open the motor switch $L^1$ and thus bring the motor K and the driving shaft $K^4$ to rest. This completes the cycle, the meter being left short-circuited, thus retaining the indication, which can be read off at any time (within the limits of gravitational drift to which such meters are subject) prior to the starting up of the next traversing cycle for a new workpiece.

In the alternative arrangement, using a heavily damped or long period meter, with several traverses of the stylus during each complete traversing movement, the signal may be fed continuously to the meter, but for the protection of the meter against surges, it is desirable to provide a short-circuiting switch, which is closed during the operation of the retracting device.

The apparatus may also be used by applying the nose-piece of the casing to the test surface instead of supporting the test body on the nose-piece. For this purpose the casing may be moved from its fixed supporting framework either manually or on a lazy-tongs type extensible arm. If desirable, means may be provided for rotating the casing in its withdrawn position so that the nose-piece can be applied to the test surface irrespective of the orientation of such test surface. The amplifying device through which the output of the detector crystal is fed to the indicating meter, together with such meter, are preferably housed in a casing separate from that housing the pick-up parts of the apparatus, such casing remaining fixed in the supporting framework with the necessary electrical connections between the casings being effected by means of flexible connecting wires. Having moved the casing into position, the apparatus is used in the same manner as previously described.

The above construction of measuring or indicating apparatus may be modified in various ways within the scope of the invention, more particularly in respect of the mounting of the stylus and of the detector on the pick-up head.

The apparatus may also be modified in other ways. Thus, the detector device may not be constituted by a crystal or other relatively stiff device, but may comprise any convenient transducer capable of generating or modulating a voltage or current when one part of it is subjected to movement. Again, the mounting of the pick-up head on the driving arm, and the means for driving such arm, may be replaced by other mechanism capable of driving the pick-up head in the desired path, which path may be straight or arcuate or have such other form as may be desired. For example, the skid, instead of engaging the work surface, may be directed downwards to engage a shaped reference surface. Alternatively, a socket on the under-side of the skid arm may engage one end of a ball-ended radius guide bar, the other end of which engages in a socket carried on the casing.

It should also be made clear that although for convenience the projecting work support has been described as projecting horizontally outwards above one edge of the casing, the casing may be mounted in the inverted position or in any other desired position, the elements of the pick-up being balanced to permit operation in such other positions. Again, the nose-piece need not be slotted, the stylus projecting upwardly by the side of the nose-piece into engagement with the test surface.

Further, the invention is not limited to retraction of the skid and stylus by the action of a cam on the pick-up head. Thus, in cases where the skid acts on a separate guide surface instead of on the test surface, or where the pick-up head is otherwise guided without the use of a rounded skid, the cam for effecting the retracting movement may act directly on the stylus arm, thus retracting the stylus. Again, a device other than a cam may be employed for effecting the retraction of the skid and stylus or of the stylus alone. Thus, for instance, the switch-operating cam may be used for this purpose, a further switch being controlled thereby for energising a solenoid to effect the retraction. Further, the release of the stylus or of the skid and stylus from the retracted position, prior to the beginning of a new traversing movement may be effected by the starting lever either directly or through a switch and solenoid instead of by the driving mechanism. It may be convenient to use the starting lever to control both retraction and release, a suitable interlock with the driving mechanism being provided to ensure that retraction is effected at the correct moment.

What I claim as my invention and desire to secure by Letters Patent is:

1. Apparatus for measuring or indicating the roughnesses or undulations of the surface of a workpiece, comprising a casing, a member on the casing for engaging with the workpiece, a stylus, means for urging the stylus into engagement with the test surface of the workpiece, a control assembly including driving means within the casing for traversing the stylus along the test surface and control means for such driving means, detecting means within the casing responsive to the working movements of the stylus approximately normal to the surface during the traversing movement for operating a measuring or indicating instrument, and means automatically actuated by the control assembly at the end of a traversing movement to retract the stylus at an angle to the direction of said traversing movement into a position in which it will not project appreciably beyond the surface of the work-engaging member when such member and the workpiece are no longer in engagement.

2. Measuring or indicating apparatus as claimed in claim 1, including means automatically actuated by operation of the control means for starting the driving means in readiness for a fresh traversing movement to cause the stylus to be released from its retracted position whereby it will again be urged into engagement with the test surface.

3. Measuring or indicating apparatus as claimed in claim 2, in which the work-engaging member is provided with a slot, through which the stylus projects into engagement with the test surface and along which the stylus is traversed.

4. Measuring or indicating apparatus as claimed in claim 3, in which the work-engaging member is constituted by an elongated slotted extension of a plate-like element on the casing and projects beyond the walls of the casing.

5. Apparatus for measuring or indicating the roughnesses or undulations of the surface of a workpiece, comprising a casing, a member on the casing for engaging with the workpiece, a pick-up head within the casing, a stylus, a supporting arm pivotally mounted on the pick-up head for carrying the stylus, means for biassing the supporting arm relatively to the pick-up head for urging the stylus into engagement with the test surface of the workpiece, a control assembly including means within the casing for driving the pick-up head and thereby traversing the stylus along the test surface and control means for such driving means, detecting means within the casing responsive to the relative movements between the stylus and the pick-up head in a direction approximately normal to the test surface during traversing for operating a measuring or indicating instrument, and means automatically actuated by the control assembly at the end of a traversing movement to retract the stylus at an angle to the direction of said traversing movement into a position in which it will not project appreciably beyond the surface of the work-engaging member when such member and the workpiece are no longer in engagement.

6. Measuring or indicating apparatus as claimed in claim 5, including a rounded skid carried by the pick-up head, and means for biassing the pick-up head relatively to the casing for urging the rounded skid into engagement with the test surface, whereby such skid constitutes a reference datum for the working movements of the stylus.

7. Measuring or indicating apparatus as claimed in claim 6, in which the work-engaging member is provided with a slot, through which the rounded skid and the stylus project into engagement with the test surface and along which the skid and the stylus are traversed.

8. Measuring or indicating apparatus as claimed in claim 5, including means automatically actuated by operation of the control means for starting the driving means in readiness for a fresh traversing movement to cause the stylus to be released from its retracted position whereby it will again be urged into engagement with the test surface.

9. Apparatus for measuring or indicating the roughnesses or undulations of the surface of a workpiece, comprising a casing, a slotted member on the casing for engaging with the workpiece, a drive member movably carried by the casing, a pick-up head pivoted to such drive member within the casing, a rounded skid carried by the pick-up head, means for biassing the pick-up head relatively to the casing and thereby urging the rounded skid into engagement with the test surface of the workpiece through the slot in the work-engaging member, a stylus, a supporting arm pivotally mounted on the pick-up head for carrying the stylus, means for biassing the supporting arm relatively to the pick-up head and thereby urging the stylus into engagement with the test surface through the slot in the work-engaging member, driving means within the casing for driving the drive member and the pick-up head relatively to the casing and thereby traversing the skid and the stylus along the slot in the work-engaging member and along the test surface, detecting means within the casing responsive to the working movements of the stylus relative to the rounded skid during the traversing movement for operating a measuring or indicating instrument, and retracting means automatically actuated by the driving means at the end of a traversing movement to retract the stylus at an angle to the direction of said traversing movement into a position in which it will not project appreciably beyond the surface of the work-engaging member when such member and the workpiece are no longer in engagement.

10. Measuring or indicating apparatus as claimed in claim 9, in which the retracting means includes means for causing the pick-up head to move about its pivot whereby the rounded skid is also retracted into a position in which it will not project appreciably beyond the surface of the work-engaging member when such member and the workpiece are no longer in engagement.

11. Measuring or indicating apparatus as claimed in claim 10, including control means for starting the driving means in readiness for a fresh traversing movement and for bringing the driving means to rest at the end of the traversing movement, and means automatically actuated by such control means when the driving means is started to release the skid and the stylus from their retracted positions whereby they will be urged into engagement again with the test surface.

12. Measuring or indicating apparatus as claimed in claim 11, in which the retracting means is constituted by a rotatable member which is driven by the driving means and is brought thereby at the end of a traversing movement into engagement with an element on the pick-up head to effect retraction of the skid and the stylus and thereafter remains in engagement with such element while the driving means is at rest and until the driving means is restarted to initiate a fresh traversing movement.

13. Measuring or indicating apparatus as claimed in claim 9, in which the detecting means includes a detector device for operating the measuring or indicating instrument in response to the working movements of the stylus, a support for the detector device, a normally operative connection between such support and the pick-up head, a normally operative connection between the stylus supporting arm and the detector device, a yieldable coupling forming part of at least one of such two normally operative connections for rendering the detector device unresponsive to the working movements of the stylus, and clamping means operative to render the yieldable coupling unyielding and thereby to rendering the detector device responsive to the working movements of the stylus.

14. Measuring or indicating apparatus as claimed in claim 13, including an electric switch actuated by the driving means at the beginning of a traversing movement after the skid and the stylus have been released from their retracted positions, and means automatically operated by such switch on actuation thereof to cause electromagnetic operation of the clamping means.

References Cited in the file of this patent
UNITED STATES PATENTS

| | | |
|---|---|---|
| 2,344,217 | Reason et al. | Mar. 14, 1944 |
| 2,372,451 | Reason | Mar. 27, 1945 |
| 2,733,598 | Miner | Feb. 7, 1956 |